Dec. 15, 1964   J. KÄGI   3,161,572
NUCLEAR REACTOR PLANT FOR UTILIZING HEAT GENERATED THEREIN
Filed April 5, 1961   3 Sheets-Sheet 1

Inventor:
JAKOB KÄGI.
By K.B. Muyl.
Attorney.

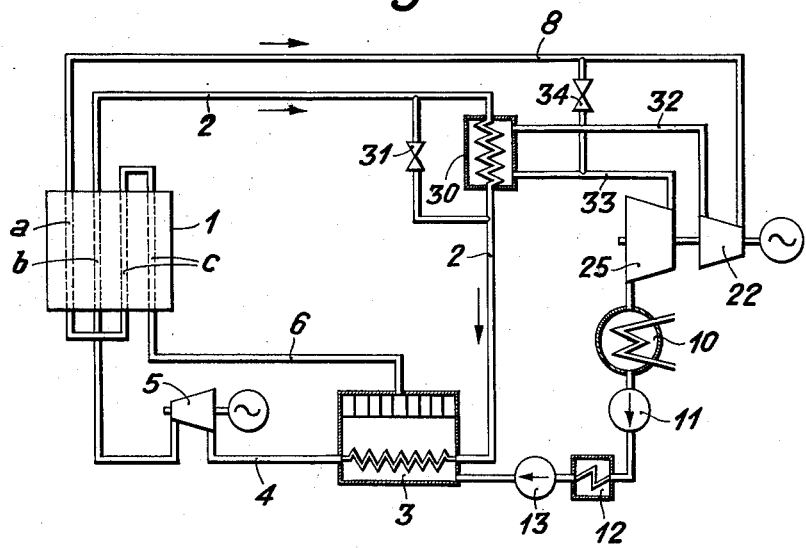
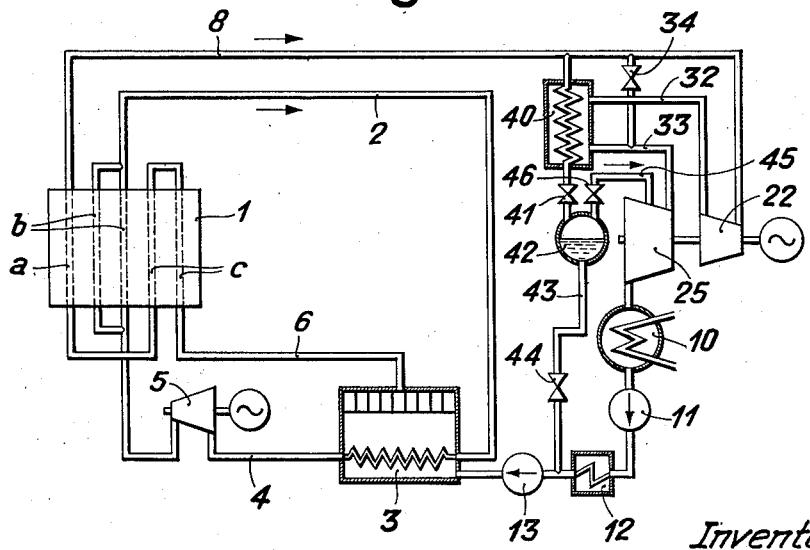

United States Patent Office 3,161,572
Patented Dec. 15, 1964

3,161,572
NUCLEAR REACTOR PLANT FOR UTILIZING HEAT GENERATED THEREIN
Jakob Kägi, Winterthur, Switzerland, assignor to Sulzer Freres, S.A., Winterthur, Switzerland, a corporation of Switzerland
Filed Apr. 5, 1961, Ser. No. 100,888
Claims priority, application Switzerland, Apr. 11, 1960, 4,056/60
4 Claims. (Cl. 176—59)

The present invention relates to a nuclear reactor and a system for producing useful vapor in an evaporator placed outside of the reactor by heat generated in the reactor.

Plants for utilizing the heat generated in a nuclear reactor have been proposed wherein steam is used as a coolant for the fuel elements of the reactor and is thereby superheated, the superheated steam being used for heating an evaporator for evaporating a liquid. The so produced vapor is superheated by heat generated in the reactor and is used in part, for example, in a steam turbine, and in part for heating the evaporator. Reactor plants have also been proposed wherein a liquid or gaseous heat carrier fluid is conducted as a coolant through the reactor and the coolant, heated in the reactor, is cooled by transferring heat in a heat exchanger to an operating fluid which carries heat to a heat consumer such as a turbine wherein the heat is converted into mechanical power.

It is well known that for obtaining a satisfactory operating efficiency of the reactor the envelopes or cans of the fuel rods must be made of a material having a small neutron capture cross-section. Such materials, however, cannot be highly heated and the temperature of the coolant leaving the reactor is, therefore, limited so that the thermal efficiency of the plant utilizing the heat contained in the coolant is not very great.

It is an object of the present invention to provide a nuclear reactor and a system for utilizing the heat generated therein whereby the reactor can be operated at high efficiency and the useful heat is obtained at temperatures which permit utilization thereof at high thermal efficiency. This object is obtained by placing parts of conduit means conducting a fluid and forming at least two separate circuits in the reactor for absorbing heat generated therein by the fluids circulating in the circuits, the fluid circulating in one of said circuits serving as a heat carrier for transporting heat received in the reactor to an evaporator forming part of the conduit means of the second circuit and evaporating the fluid circulating in the second circuit, means being interposed in the second circuit for utilizing the heat contained in the vapor produced in the evaporator. The two circuits operate at different pressures and temperatures. The fluid circulating in the first circuit serves merely for evaporating the fluid of the second circuit and its temperature need only be little higher than the vaporizing temperature of the fluid of the second circuit. The vapor of the fluid of the second circuit is conducted through the reactor to be superheated by the heat generated therein before the vapor is utilized, for example, for producing mechanical power. The envelopes of the fuel rods which are cooled by the fluid of the first circuit can therefore be made of material which is relatively little heat resistant and has a small neutron capture cross-section, and only the fuel rods which are cooled by the fluid of the second circuit must be provided with higher heat and pressure resisting material.

In order to counterbalance the increased neutron capture cross-section of the envelopes of the fuel rods supplying the heat for superheating the vapor of the second circuit, these fuel rods preferably contain enriched fissionable material.

It is of advantage to place the last ones of the fuel bodies which supply heat to the fluid of the second circuit before it leaves the reactor, into a zone of the reactor wherein relatively little heat is generated, because, there, no great temperature drop between the fuel body and the coolant is required to transfer the relatively small amount of heat to the coolant.

The system according to the invention provides for purifying the fluids circulating in the two separate circuits whereby fluid is tapped from the first circuit and conducted, after purifying, into the second circuit and therefrom back into the first circuit, or fluid is tapped from the first circuit, purified, and returned to the first circuit.

The system according to the invention also provides for reheating the vapor in the second circuit as it passes from a high pressure stage to a low pressure stage of a turbine by returning the vapor to the reactor to be reheated therein, or, alternatively, by reheating the vapor outside of the reactor by heat of the fluid circulating in the first circuit, or, as a further alternative, by reheating the vapor by vapor tapped from a relatively high temperature portion of the second circuit, and by returning the thus cooled fluid of the second circuit to suitable low pressure portions of the second circuit.

The novel features which are considered characteristic of the invention are set forth with particularity in the appended claims. The invention itself, however, and additional objects and advantages thereof will best be understood from the following description of embodiments thereof when read in connection with the accompanying drawing wherein:

FIG. 3 is a diagrammatic illustration of a further modification of the system according to the invention.

FIG. 4 is a diagrammatic illustration of yet another modification of the system according to the invention.

In the several figures of the drawing, like elements are designated by like numerals.

Figure 1:
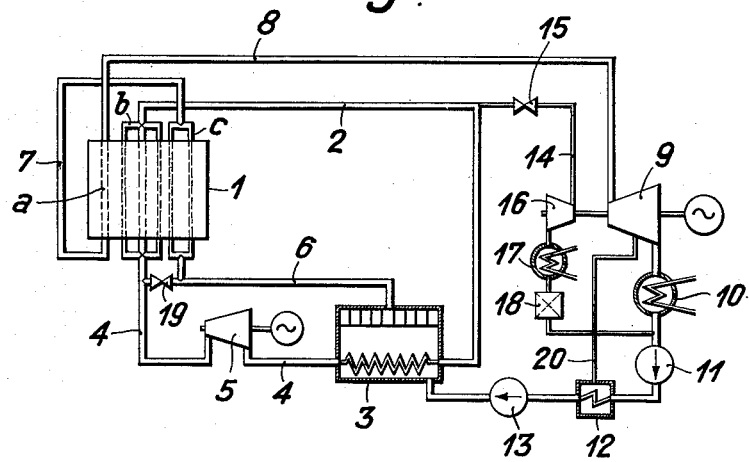
FIG. 1 is a diagrammatic illustration of a system according to the invention.

Referring more particularly to FIG. 1 of the drawing, numeral 1 designates a nuclear reactor core provided with groups of fuel elements $a$, $b$, $c$, only one element of group $a$, three elements of group $b$ and two elements of group $c$ being shown in FIG. 1, although each group will usually comprise a much greater number of fuel elements. The fuel elements comprise fuel rods made of fissionable material, for example uranium, which rods are surrounded in the conventional manner by an envelope protecting the fuel rod o rrods against corrosion and preventing escape of fissionable material and fission products to the outside. The fuel elements are placed in tubes conducting an operating fluid and surrounded by moderator material. The outlets of the tubes of the fuel elements $b$ are connected by means of a pipe 2 for fluid flow with a tubular heating surface forming part of an evaporator 3. The outlet of the tubular heating surface is connected by a pipe 4 with the inlet of the tubes of the fuel elements $b$, a circulating pump 5 being interposed in the pipe 4. The vapor outlet of the evaporator 3 is connected by a pipe 6 to the inlets of the tubes of the fuel elements $c$. The outlets of the tubes of the fuel elements $c$ are connected by a pipe 7 to the inlet of the tube of the fuel element $a$. The outlet of the last mentioned tube is connected by a pipe 8 to a turbine 9 which exhausts into a condenser 10, the condensate being pumped by a pump 11 through a preheater 12 and therefrom by means of a feed pump 13 into the evaporator 3.

A pipe 14 containing a valve 15 is connected to the pipe 2 and terminates in a turbine 16 which exhausts into a condenser 17, the condensate being passed through a decontaminator or purifier 18 and therefrom into the condensate flowing from the condenser 10 to the condensate pump 11. The pipe 4 at a point between the outlet of the pump 5 and the coolant inlets of the fuel elements forming the group b is connected by a pipe containing a throttle valve 19 to the pipe 6. The preheater 12 receives, through a pipe 20, vapor tapped from the turbine 9.

The pipe 2, the tubular heating surface of the evaporator 3, the pipe 4 with the circulating pump 5 interposed therein, and the tubes of the fuel elements of the group b form a first circuit preferably conducting vapor which is superheated by the heat generated in the fuel elements of the group b. The superheated vapor is cooled in the evaporator 3 by transferring heat to the fluid circulating through a second circuit formed by the elements 6, c, 7, a, 8, 9, 10, 11, 12, 13 and 3. Circulation of the vapor in the first circuit is maintained by the blower 5. The fluid of the second circuit arrives in liquid state in the evaporator 3 and is evaporated therein, the vapor being conducted through the pipe 6 to the tubes of the fuel elements of the group c for superheating, the superheated vapor being conducted through the pipe 7 to the tube of the fuel element a for additional superheating. The now highly superheated vapor is conducted through the pipe 8 to the turbine 9 for expansion and producing mechanical power therein. As has been described before, the exhaust of the turbine is condensed in the condenser 10, the condensate being conducted into the evaporator 3.

The system according to the invention permits operation of the two circuits, one circuit conducting heat generated by the nuclear reactor to an evaporator and the second circuit including means for utilizing heat generated in the nuclear reactor and receiving heat from the first circuit as well as from the nuclear reactor, at different pressures and temperatures. The first circuit may be operated at pressures and temperatures which are lower than the highest pressure and temperature in the second circuit at the location where the second circuit leaves the reactor. The fuel elements forming part of the first circuit may be provided with envelopes made of aluminum, zirconium, or other material having a relatively small neutron capture cross-section and being less temperature and pressure resistant than the material of which the envelopes of the fuel elements forming part of the second circuit are made. The envelopes of the fuel elements of the groups a and c which form part of the second circuit are preferably made of austenitic steel or another relatively high heat and pressure resistant material. The fuel rods of the groups a and c may include enriched fissionable material to counterbalance the less favorable action of the highly heat resistant envelopes. In this manner the portion of the first circuit extending through the reactor may be constructed to obtain optimal conditions therein whereas the second circuit can be operated at a higher pressure and a higher temperature for improving the thermal efficiency of the plant.

Figure 2:
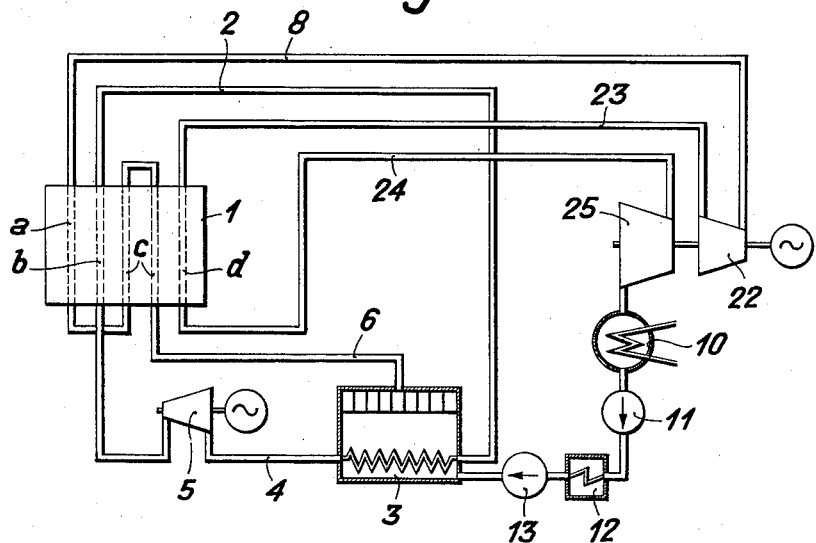
FIG. 2 is a diagrammatic illustration of a modified system according to the invention.

FIG. 2 illustrates a two-circuit system according to the invention including a multistage turbine. The first circuit includes, as in FIG. 1, an evaporator 3, a pipe 4, a blower 5 therein, a group of fuel elements b, and a pipe 2. The second circuit comprises a pipe 6 connected to the vapor space of the evaporator 3, groups of fuel elements c and a, a pipe 8, and a high pressure turbine 22. The exhaust of the latter is conducted by means of a pipe 23 to tubes of fuel elements of a group d in the reactor core 1, the vapor reheated by the fuel elements of the group d being conducted through a pipe 24 to a low pressure turbine 25. The exhaust of the latter is condensed in a condenser 10 and returned to the evaporator 3 through the elements 11, 12 and 13. In the embodiment of the invention according to FIG. 2, the operating medium partly expanded in the high pressure turbine 22 is reheated by heat generated in the reactor. Due to the relatively low pressure in this part of the circuit the envelopes of the fuel elements pertaining to the group d may have a smaller neutron capture cross-section.

In the embodiment shown in FIG. 3 the means for utilizing the heat generated in the reactor are also formed by a multistage turbine. The vapor partly expanded in the high pressure stage 22 of the turbine is conducted through a heat exchanger 30 which is interposed in the first circuit 2, 3, 4, 5, b and receives heat from the fluid circulated therein. A pipe containing a throttle valve 31 is connected to the first circuit for by-passing the heat exchanger 30 for controlling the heat transfer in the heat exchanger. The exhaust of the turbine 22 is conducted through a pipe 32 to the heat exchanger 30 and therefrom to the low pressure stage 25 of the turbine through a pipe 33. The pipes 8 and 33 are interconnected by a pipe containing a throttle valve 34 so that the second turbine stage 25 may be directly supplied with high pressure vapor from the pipe 8. The reactor of the system shown in FIG. 3 is simpler than the reactor needed for the system shown in FIG. 2, because reheating of the vapor is done outside of the reactor.

FIG. 4 shows another modification of a system according to the invention including a reheater 40 outside of the nuclear reactor. Instead of interposing this reheater in the first circuit for receiving heat therefrom, the reheater is heated by vapor taken from the pipe 8. The vapor which has been cooled and completely or partly condensed in the heat exchanger 40 is conducted through a throttle valve 41 to a separator 42, the liquid separated therein being conducted through a pipe 43 provided with a throttle valve 44 to the inlet of the feed pump 13. The vapor separated in the separator is conducted through a pipe 45 provided with a throttle valve 46 to a suitable stage of the low pressure turbine 25.

The system shown in FIG. 4 is suitable in plants requiring a higher reheat temperature than the temperature available in the first circuit.

Figure 5:
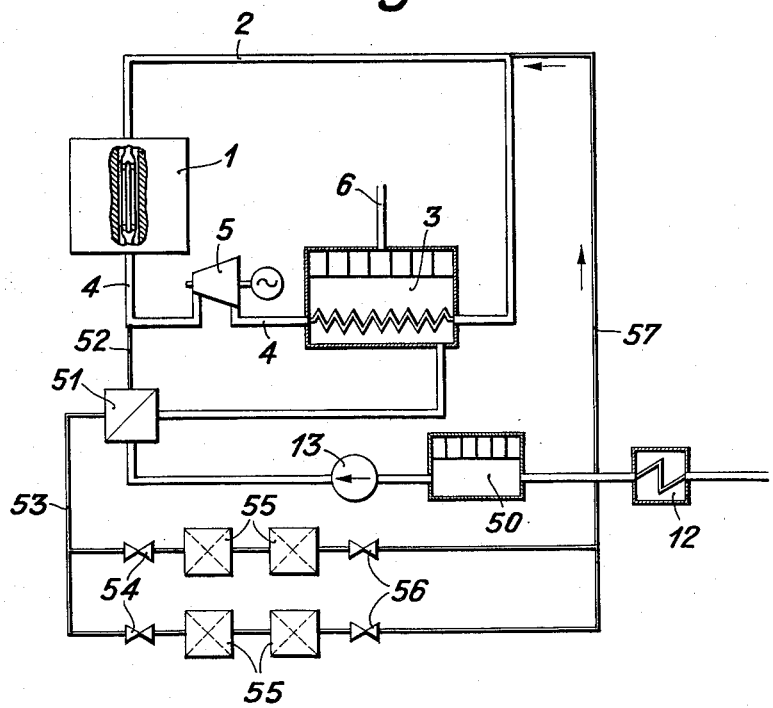
FIG. 5 is a diagrammatic illustration of a further modification of the system according to the invention.

FIG. 5 illustrates a portion of the system shown in FIG. 1, the system being provided with a decontamination or purifying apparatus for the fluid circulating in the first circuit. A storage vessel 50 for the liquid circulating in the second circuit is interposed between the preheater 12 and the feed pump 13. A heat exchanger 51 is interposed in the conduit connecting the feed pump 13 with the evaporater 3. Fluid is tapped from the conduit portion forming part of the first circuit and connecting the circulating pump 5 with the reactor 1. The tapped fluid is conducted through a pipe 52 into the heat exchanger 51 for indirectly preheating the liquid of the second circuit pumped into the evaporator 3. The fluid tapped from the first circuit which is in the vapor state, is cooled and at least partly condensed in the heat exchanger 51. The cooled and condensed fluid leaves the heat exchanger 51 through a pipe 53 to which decontamination or purifying apparatus 55 are connected in parallel relation. Valves 54 are interposed between each of the apparatus 55 and the pipe 53. The apparatus 55 are connected to a pipe 57 which conducts the effluent of the apparatus 55 into the conduit 2 of the first circuit. Valves 56 are interposed between the outlets of the apparatus 55 and the pipe 57. Because of the higher pressure in the pipe 4 downstream of the circulating pump 5 than in the conduit 2, the fluid flows from the pipe 52 through the heat exchanger 51, the pipe 53, the valves 54, the decontamination apparatus 55 and the valves 56 into the conduit 57. The liquid fluid flowing from the pipe 57 into the conduit 2 is quickly evaporated in the conduit 2 wherein highly superheated vapor flows. The system shown in FIG. 5 affords continuous decontamination of the fluid circulating in the first circuit at a cost which is lower than in the system shown in FIG. 1. The system according to FIG. 5 is preferred in cases where the fluid tapped from the first circuit for decontamination is relatively small so that thermodynamic loss caused by the cooling of the fluid of the first circuit in the heat exchanger 51 can be neglected. The system shown in FIG. 1 is preferred in cases where the amount of fluid tapped from the fisrt circuit for decontamination purposes is relatively great.

The efficiency of the system according to the invention is better than the efficiency of conventional systems. In order to obtain still higher temperatures of the superheated vapor leaving the reactor in the second circuit and to improve the thermal efficiency, the vapor from the evaporator 3 is preferably so conducted through the fuel elements that the fuel elements which are last passed through by the vapor pertain to a zone of the reactor where the heat generation is relatively low. In a zone of relatively low heat generation the temperature drop between the fissionable material and the cooling agent is relatively small so that at a predetermined permissible temperature of the fissionable material or its envelope the temperature of the coolant can be higher.

The fluid circulating in the second circuit is preferably water and steam. It is of advantage to use also water or steam as the heat carrier fluid in the first circuit. Continuous decontamination of the fluid in the first circuit makes it unnecessary that the conduits forming the first circuit are absolutely tight. In the arrangement according to FIG. 1 the fluids circulating in both circuits are continuously decontaminated. Conventional filters or ion exchangers may be used as decontamination apparatus.

I claim:

1. A system for utilizing the heat generated in a nuclear reactor having a zone wherein relatively much heat is generated and a zone wherein relatively little heat is generated, said system comprising:

a first circuit formed by conduit means having a portion extending through the reactor, steam only circulating in said first circuit and being superheated therein, a second circuit formed by conduit means having a portion extending through said reactor, steam only circulating through said portion of said conduit means of said second circuit and being superheated therein, said conduit means of said second circuit including a steam heat consumer and condenser, an evaporator placed outside of the reactor and connected to said condenser for receiving water therefrom and connected to said portion of said second conduit means for supplying steam thereto, said evaporator being interposed in the conduit means of said first circuit for transferring heat from the steam circulating in said first circuit to the water in said evaporator for evaporating the water, the pressure of the superheated steam leaving said portion of said first conduit means being lower than the pressure of the superheated steam leaving said portion of said conduit means of said second circuit, and fuel elements placed in each reactor zone and including tubular means forming part of the conduit means forming said circuits, the elements including tubular means forming part of the conduit means of the second circuit and through which the steam of the second circuit flows last before leaving the reactor being placed in a zone wherein relatively little heat is generated.

2. A system for utilizing the heat generated in a nuclear reactor, comprising:

a first circuit formed by conduit means having a portion extending through the reactor, steam only circulating in said first circuit and being superheated therein, a second circuit formed by conduit means having a portion extending through said reactor, steam only circulating through said portion of said conduit means of said second circuit and being superheated therein, said conduit means of said second circuit including a multistage steam turbine and a condenser, an evaporator placed outside of the reactor and connected to said condenser for receiving water therefrom and connected to said portion of said second conduit means for supplying steam thereto, said evaporator being interposed in the conduit means of said first circuit for transferring heat from the steam circulating in said first circuit to the water in said evaporator for evaporating the water, the pressure of the superheated steam leaving said portion of said first conduit means being lower than the pressure of the superheated steam leaving said portion of said conduit means of said second circuit, and conduit means for conducting the exhaust of a relatively high pressure stage of said turbine through the reactor to receive heat therefrom and for conducting the reheated vapor into a relatively low pressure stage of said turbine.

3. A system for utilizing the heat generated in a nuclear reactor, comprising:

a first circuit formed by conduit means having a portion extending through the reactor, steam only circulating in said first circuit and being superheated therein, a second circuit formed by conduit means having a portion extending through said reactor, steam only circulating through said portion of said conduit means of said second circuit and being superheated therein, said conduit means of said second circuit including a multistage steam turbine and a condenser, an evaporator placed outside of the reactor and connected to said condenser for receiving water therefrom and connected to said portion of said second conduit means for supplying steam thereto, said evaporator being interposed in the conduit means of said first circuit for transferring heat from the steam circulating in said first circuit to the water in said evaporator for evaporating the water, the pressure of the superheated steam leaving said portion of said first conduit means being lower than the pressure of the superheated steam leaving said portion of said conduit means of said second circuit, a heat exchanger interposed in said first circuit, and conduit means connecting a relatively high pressure stage of said turbine to said heat exchanger and the latter to a relatively low pressure stage of said turbine for reheating in said heat exchanger the steam flowing from the high pressure stage to the low pressure stage of said turbine.

4. A system for utilizing the heat generated in a nuclear reactor, comprising:

a first circuit formed by conduit means having a portion extending through the reactor, steam only circulating in said first circuit and being superheated therein, a second circuit formed by conduit means having a portion extending through said reactor, steam only circulating through said portion of said conduit means of said second circuit and being superheated therein, said conduit means of said second circuit including a multistage steam turbine and a condenser, an evaporator placed outside of the reactor and connected to said condenser for receiving water therefrom and connected to said portion of said second conduit means for supplying steam thereto, said evaporator being interposed in the conduit means of said first circuit for transferring heat from the steam circulating in said first circuit to the water in said evaporator for evaporating the water, the pressure of the superheated steam leaving said portion of said first conduit means being lower than the pressure of the superheated steam leaving said portion of said conduit means of said second circuit, a heat exchanger connected to said second circuit upstream of said turbine for receiving steam from said second circuit, and conduit means connecting a relatively high pressure stage of said turbine to said heat exchanger and the latter to a relatively low pressure stage of said turbine for reheating in said heat exchanger the steam flowing from the high pressure stage to the low pressure stage of said turbine.

References Cited by the Examiner
UNITED STATES PATENTS
3,085,964  4/63  Ritz et al. _____ 176—61

FOREIGN PATENTS
1,189,724  3/59  France.

OTHER REFERENCES

Proceedings on the Second United Nations International Conference on the Peaceful Uses of Atomic Energy, vol. 8, Geneva, 1958, pp. 398–414.

CARL D. QUARFORTH, *Primary Examiner.*
REUBEN EPSTEIN, *Examiner.*